United States Patent [19]

Janninck

[11] 3,841,530

[45] Oct. 15, 1974

[54] POWDER FEEDER

[76] Inventor: Donald R. Janninck, 1811 N. Lowell Ave., Chicago, Ill. 60639

[22] Filed: July 26, 1972

[21] Appl. No.: 275,205

Related U.S. Application Data

[63] Continuation of Ser. No. 29,900, April 20, 1970, abandoned.

[52] U.S. Cl. ................ 222/189, 222/193, 222/203, 222/226
[51] Int. Cl. ............................................. B67d 5/58
[58] Field of Search ........... 222/193, 189, 195, 202, 222/203, 410, 413; 302/47, 52

[56] References Cited
UNITED STATES PATENTS

| | | | |
|---|---|---|---|
| 718,985 | 1/1903 | Davis | 302/47 X |
| 954,944 | 4/1910 | Dunn | 302/47 |
| 1,185,156 | 5/1916 | Wood | 302/47 X |
| 1,188,127 | 6/1916 | Wright | 222/193 X |
| 1,361,293 | 12/1920 | Talbert et al. | 222/193 X |
| 1,420,601 | 6/1922 | Wright | 222/193 |
| 1,529,173 | 3/1925 | Didinger | 222/189 |
| 1,644,175 | 10/1927 | Church | 222/202 |
| 2,578,482 | 12/1951 | Mindrup | 222/410 X |
| 2,795,080 | 6/1957 | Williams | 222/193 |
| 3,144,176 | 8/1964 | Gronkvist | 222/203 X |
| 3,212,682 | 10/1965 | Newell | 222/189 |
| 3,249,263 | 5/1966 | Howard | 222/195 X |
| 3,264,037 | 8/1966 | Smith | 302/52 |
| 3,414,168 | 12/1968 | Eckhardt | 222/413 X |

FOREIGN PATENTS OR APPLICATIONS

| | | | |
|---|---|---|---|
| 215,932 | 7/1958 | Australia | 222/195 |

*Primary Examiner*—Allen N. Knowles
*Attorney, Agent, or Firm*—Neuman, Williams, Anderson & Olson

[57] ABSTRACT

Apparatus for feeding fine particulate material, comprising a supply chamber having a foraminous bottom member and superposed brush arms for brushing the material therethrough at a regulatable rate. A collecting funnel member is disposed beneath the foraminous member, with its large end open upward to receive the material. Conveying gas is admitted into the funnel member and passes out through the bottom opening of the funnel with the particulate material entrained therein. In three embodiments the funnel member is vibrated to maintain uniform flow of the material and gas may be admitted into the upper end of the funnel. In another embodiment the gas is admitted through gas manifold conduits rotating along a stationary funnel wall, and is directed along wall scrapers supported on these conduits. A vibratile screen preferably is interposed between the foraminous member and the upper end of the funnel to assist in deagglomeration of the falling particles and in obtaining uniform feeding of the material.

18 Claims, 13 Drawing Figures

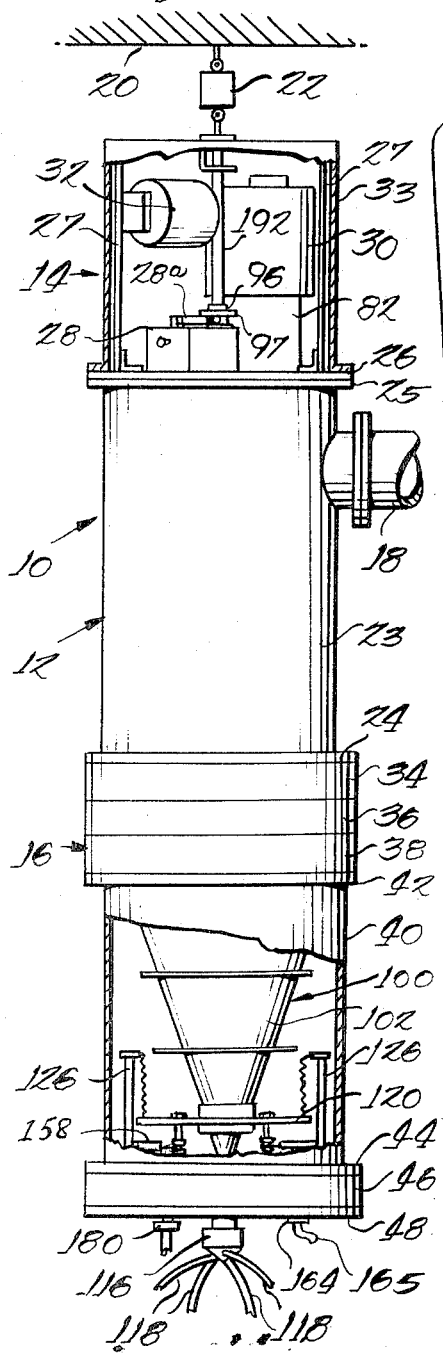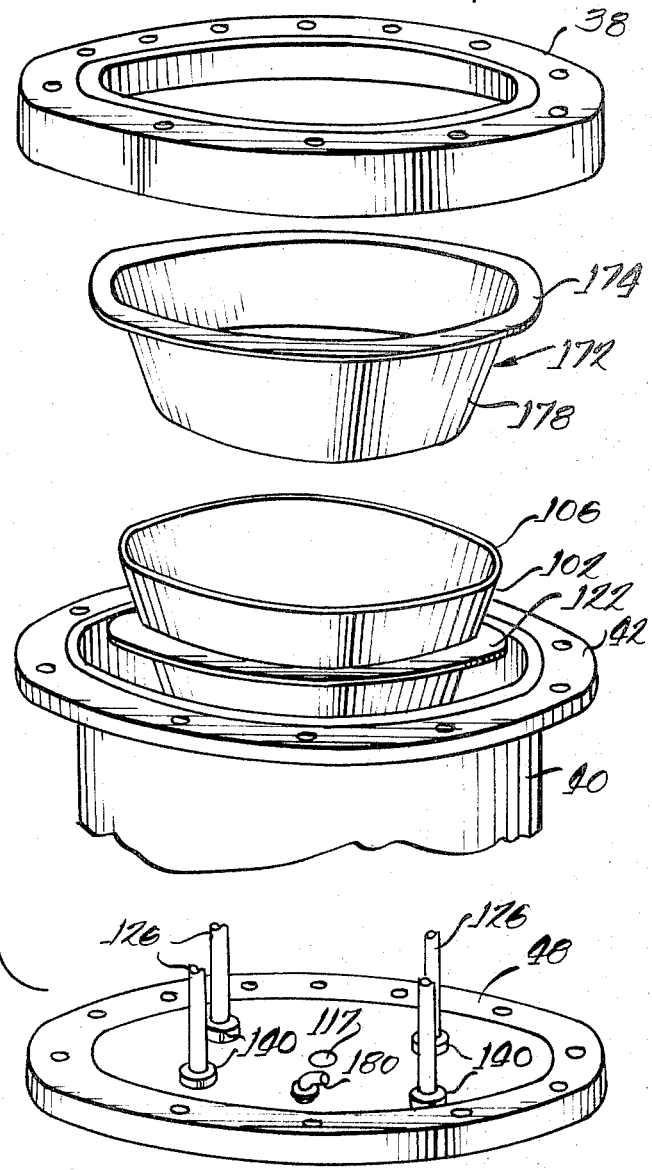

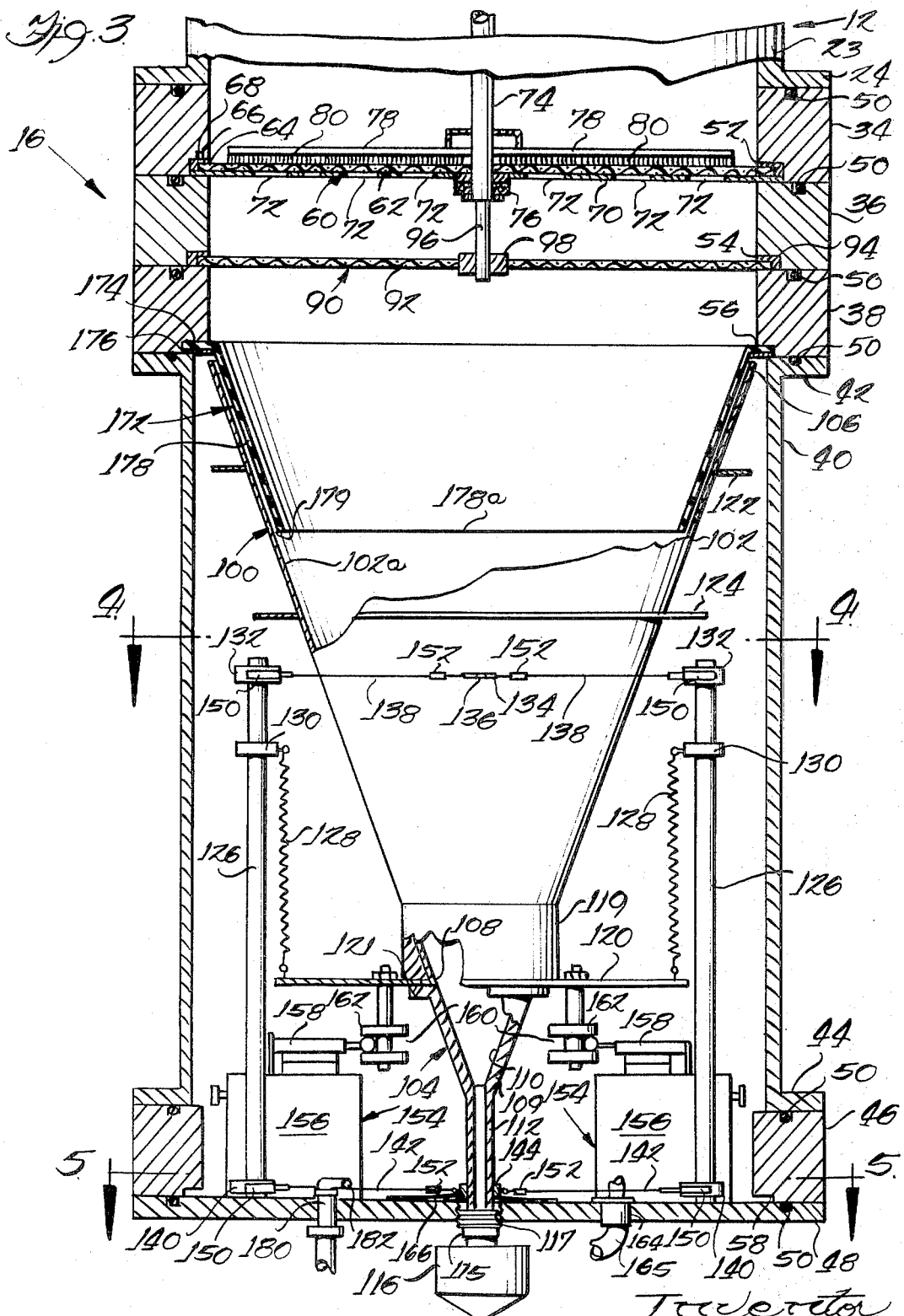

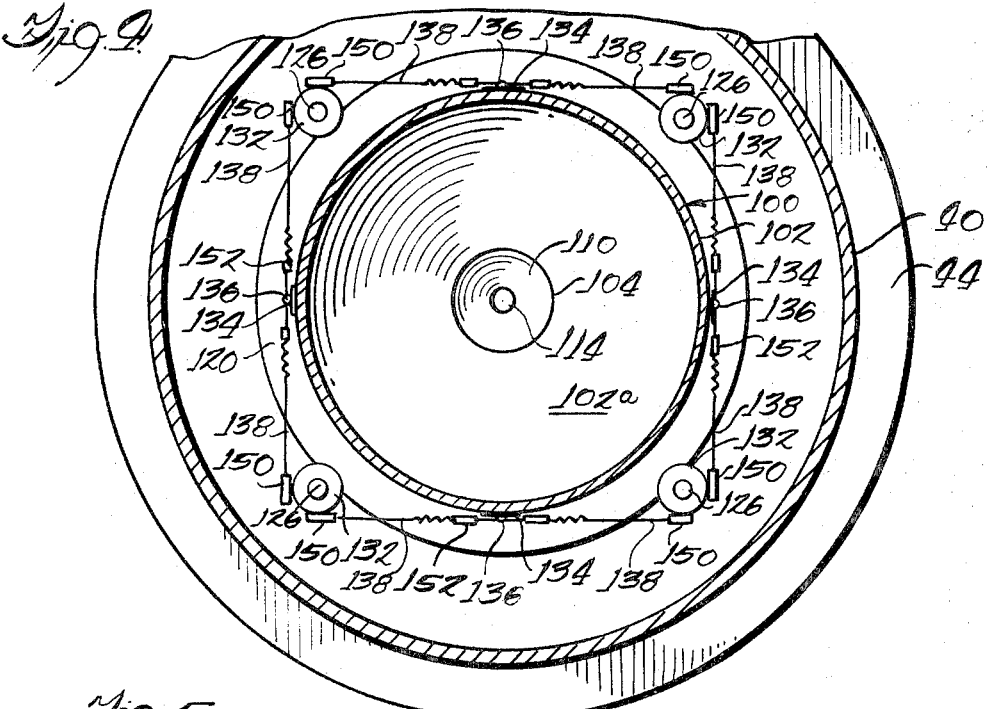
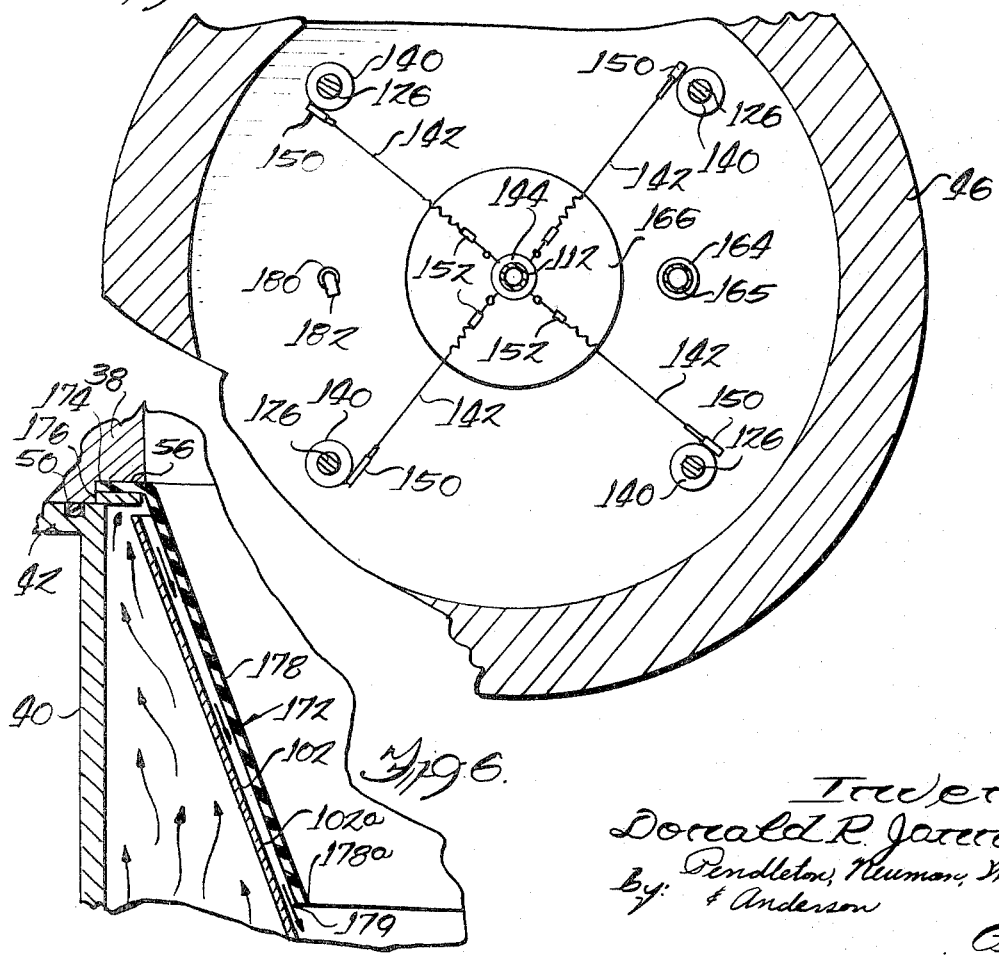

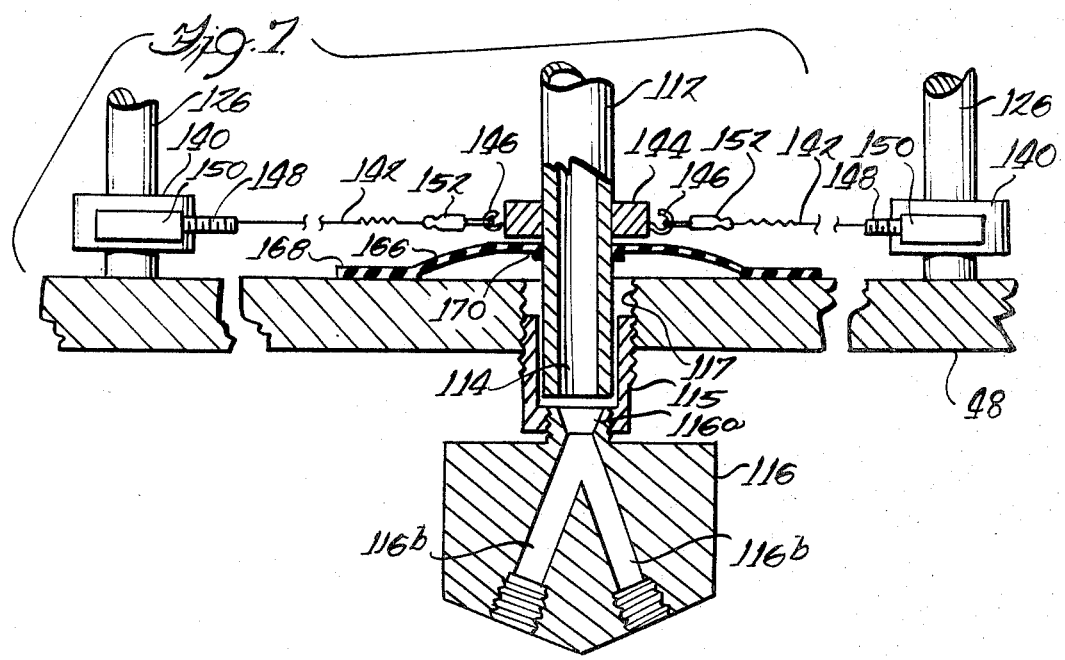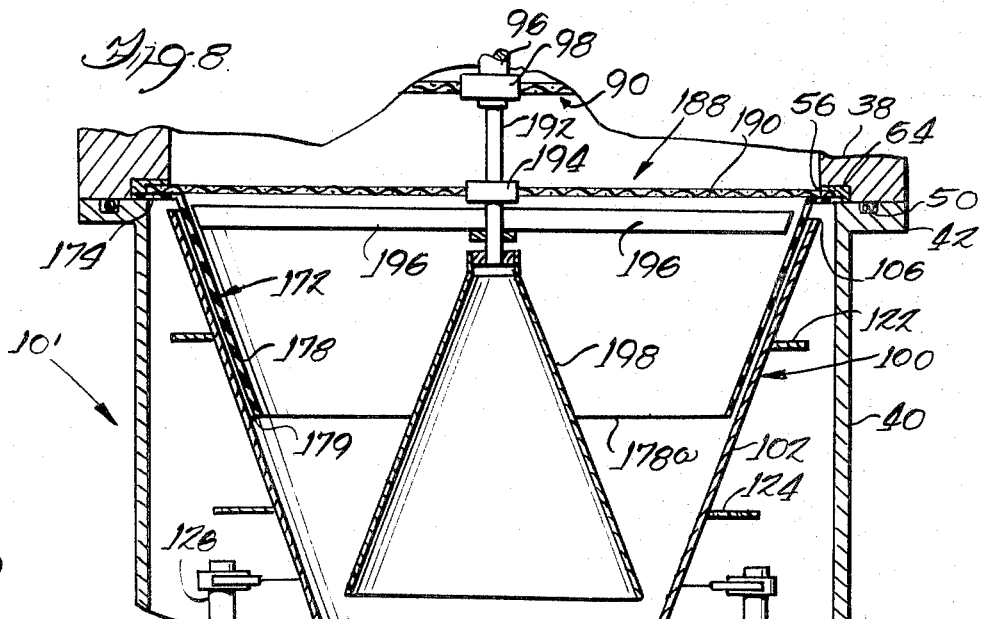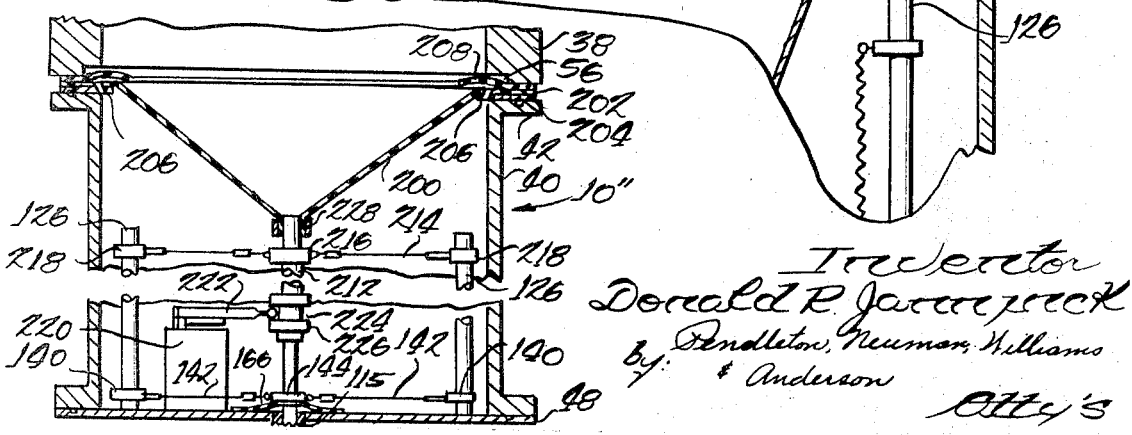

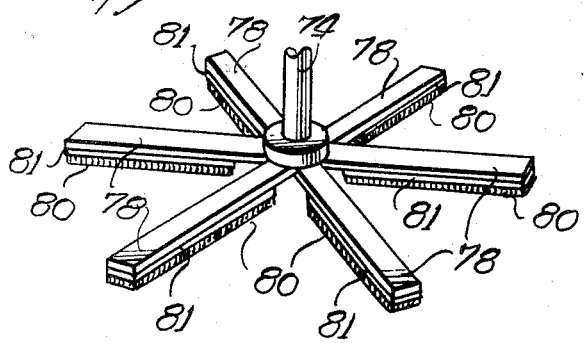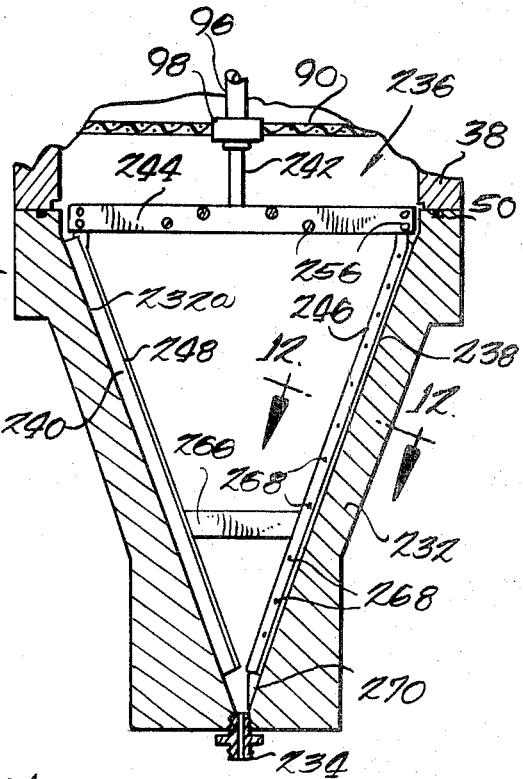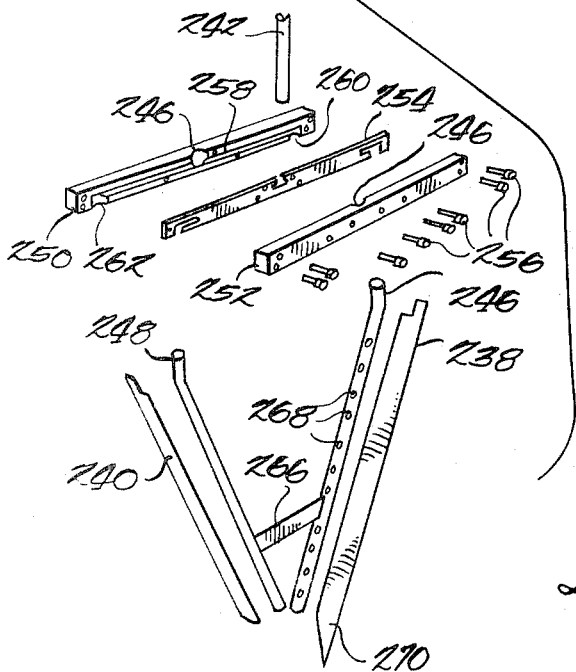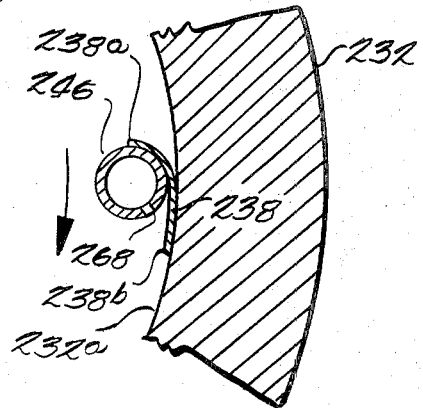

3,841,530

POWDER FEEDER

This is a continuation of application Ser. No. 29,900, filed Apr. 20, 1970, now abandoned.

This invention pertains to apparatus for feeding particulate materials, and particularly to apparatus for feeding very fine powder materials at a highly uniform rate.

Various problems arise in the feeding of fine powder materials. Such materials often have an extremely high angle of repose and concomitant low flowability. Such materials also often have a tendency to agglomerate and to adhere readily to various surfaces upon impact, even in the instance of highly polished surfaces. By way of illustration, such problems are encountered when attempting to feed ultrafine silica, e.g. consisting of silica particles under 10 microns in size, with an average particle size on the order of 2 microns. The characteristics of such powders make it difficult to obtain accurate uniform feeding rates and good particle dispersion when metering and dispensing such materials.

A number of different types of apparatus are available for feeding fine powders. These include gear-type feeders, fluidized bed feeders, air-screen feeders, vibrating hoppers, sifting devices and the use of vibrating screens. However, presently known feeders embodying these various components are not entirely satisfactory toward overcoming the problems encountered when highly accurate uniform feeding of fine particulate material is required.

It will be apparent that the apparatus of the present invention will find application in any instance where accurate and uniform feeding of fine particulate materials is desired. However, one specific example which will be utilized for purposes of illustration in describing the invention and its advantageous results is the feeding of very finely divided dry particulate materials, such as the silica noted above, to the type of device commonly known as a plasma arc reactor or a plasma arc torch. Powders being fed to such a device may be entrained in an inert gas or in a gas with which the powdered substance reacts within the arc. The efficiency of the reaction is enhanced if the particles are separated from one another and uniformly distributed in the stream in the arc. Individual particles may have a residence time in the arc on the order of one millisecond. Thus, it will be appreciated that in order to obtain efficiency and uniformity in the reaction process, the particles should be separated in the feed stream, and the feed rate should be extremely uniform with respect to time, i.e., feeding substantially identical quantities within each time increment as short as 1 millisecond.

It is an object of this invention to provide improvements in apparatus for feeding fine powder materials.

It is a further object of this invention to provide improved apparatus for accurately feeding finely divided particulate materials at extremely uniform rates.

It is a further object of this invention to provide improved apparatus for feeding fine powder materials which reduces or avoids agglomeration of the particles during the feeding operation.

It is another object of this invention to provide feeding apparatus of the type noted above wherein the powder is entrained in a gas and is substantially uniformly distributed across the stream of carrier gas.

It is another object of this invention to provide feeding apparatus which is of flexible design to permit ready adaptation to specific feeding operations.

It is another object of this invention to provide feeding apparatus meeting the above-mentioned objects and which is of simple design, economical to fabricate and of rugged construction for prolonged operation.

Further and additional objects and advantages will appear from the description, accompanying drawings and appended claims.

In carrying out this invention in one illustrative form, a supply reservoir is provided having a screen at its lower end, with rotaty arms for brushing fine particulate material through said screen at a regulatable rate. A funnel-shaped guide member is disposed beneath the screen with its larger open end upward and subtending the screen member for receiving the materials dropped from such screen. A vibratile screen preferably is interposed between the hopper screen and the open end of the funnel member, and gas is fed into the funnel to flow downward along the walls for assisting in maintaining uniform flow of the material therethrough and for entraining the particles as they exit from the lower end.

For a more complete understanding of this invention, reference should now be had to the embodiments illustrated in greater detail in the accompanying drawings and described below by way of example of the invention. In these drawings, FIG. 1 is an elevation view of a feeder apparatus employing teachings of this invention, with parts of the housing broken away to illustrate certain internal components;

FIG. 2 is an enlarged exploded view illustrating certain components of the apparatus of FIG. 1;

FIG. 3 is an enlarged vertical section of the feeder section of the apparatus of FIG. 1;

FIGs. 4 and 5 are sectional views taken along lines 4—4 and 5—5 of FIG. 3, as indicated;

FIG. 6 is an enlarged partial view of a portion of the apparatus illustrated in FIG. 3;

FIG. 7 is an enlarged vertical section of a portion of the support apparatus and of the stream divider;

FIG. 8 is a partial vertical section of a modification of the apparatus of FIG. 3;

FIG. 9 is a vertical section, on a reduced scale, illustrating the feeder section of another embodiment employing teachings of this invention;

FIG. 10 is a perspective view of the brush arms;

FIG. 11 is a vertical section of the lower portion of another embodiment employing teachings of this invention;

FIG. 12 is an enlarged sectional view taken along line 12—12 of FIG. 11, as indicated; and FIG. 13 is an enlarged exploded view of the gas manifold and scrapers of FIG. 11.

Referring to the drawings, FIG. 1 illustrates a feeder 10 including a feed supply or reservoir section 12, a power section 14 and a feeder section 16. A closable conduit 18 is connected to the feed supply section for furnishing powder thereto as desired. The feeder 10 as shown in FIG. 1 is suspended from a support 20, as by a load cell 22 which may be utilized in calibrating and supervising the operation of the device. However, it will be appreciated that the feeder may be mounted by any suitable means.

The supply section 12 includes a hollow cylindrical casing 23 having a lower flange 24 which serves as a mounting flange or the components of the feeder section 16, and a top flange 25 on which the power section 14 is mounted.

The power section 14 includes a base plate 26 which extends across the upper end of section 12 and is secured to the upper flange 25 in sealing relation therewith to close the upper end of the feed supply section 12. A U-shaped support frame element 27 is mounted on the flange 26. Appropriate drive elements such as a vibrator 28 and drve motors 30 and 32 are mounted on the plate 26 and the support 27, as illustrated. The vibrator 28 and the motors 30 and 32 may be conventional drive components such as elecrically operated or fluid driven power units for obtaining the functions indicated herein. A cover 33 is provided over the components of the power section 14 and is mounted on plate 26 to provide a gas-tight sealed top enclosure.

Referring also to FIG. 3, the section 16 includes a series of annular mounting rings 34, 36 and 38, and a hollow cylindrical casing 40 having a top flange 42. The flange 42 and the noted rings are joined to one another and to the flange 24 of the section 12 by any suitable means such as bolts (not shown) extending therethrough. A lower flange 44 of casing 40 is affixed to a further annular ring 46 and to the bottom closure plate 48. O-rings 50, or other suitable gasket means provide sealed joints between the various housing components.

Each of the rings 34, 36, 38 and 46 is provided with a counterbore at its lower inner corner, as at 52, 54, 56 and 58, for the mounting of various internal components.

A circular screen unit 60 spans the space within ring 34, thereby spanning the bottom of the supply reservoir 12. The peripheral edge of the screen unit 60 is received in the recess defined by counterbore 52. The screen 60 includes a central foraminous portion 62, such as woven wire screen, with an annular peripheral flange element 64 which is L-shaped in cross section. The flange 64 receives the peripheral edge of the wire screening section 62 and is suitably joined to this screen, as by an epoxy or by soldering. A pin 66 on the flange 64 engages a recess 68 in the ring 34 to position and prevent rotation of the screen unit 60.

The screen 60 serves as the bottom of the storage section 12. A circular support plate 70 extends immediately beneath the screen, with its peripheral edge in recess 52 and resting on ring 36, to assist in supporting the screen 60 against undersirable deflection due to the weight of a supply of material in section 12. The support plate 70 may be of substantial thickness, as required to support such loads as may be encountered. Plate 70 is provided with a large number of openings as at 72 distributed throughout its area, and substantially larger than the openings in screen 60, to permit ready passage of the materials passing through the screen. As plate 70 serves a support function, it will be appreciated that it may be of other configurations, such as comprising a polar grid of support ribs, a waffle pattern of support ribs, or the like.

A hollow drive shaft 74 extends along the center axis of the supply section 12, with its upper end (not shown) extending through plate 26 and its lower end extending through the center of screen 60 and support plate 70. A bearing unit 76 is secured to the plate 70 and to the drive tube 74 at its lower end. The bearing 76 provides a journal for the lower end of the drive tube 74 and also provides a thrust bearing for vertical support of the center portion of the plate 70 and the screen 60.

A plurality of radial arms 78 (see also FIG. 10) are joined to the drive tube 74 immediately above the screen 60. Each of these arms is provided with bristles 80 extending downward from its under surface into brushing contact with the screen 60. Accordingly, rotation of the drive tube 74 causes the bristles to brush over the screen 60, thereby causing powder material in supply section 12 to sift through the screen 60. The bristles 80 may be formed of any suitable material. As one example, carding fabric or file cleaning cards of the type having a backing 81 and a large number of wire teeth may be secured to the underside of the arms 78 to provide the bristles 80. The bristles 80 should have sufficient resilience to maintain contact with the screen 60 as the arms are rotated, despite minor variations of the upper surface of the screen 60 from its nominal plane. Such variations may be encountered due to stresses and accompanying distortions when a supply of particulate material is supported on the screen 60.

Appropriate drive elements (not shown) are provided in the power section 14 for rotary drive of tube 74 by an output drive from the motor 30. By way of one example, a reduction gear unit 82 may be provided on the motor 30 with an output comprising a worm in drive engagement with a mating gear secured to the upper end of the drive tube 74. Suitable bearings are also provided for journalling the upper end of the tube for such rotation and for providing axial support of the tube on the plate 26.

Referring again to FIG. 3, a second screen member 90 spans the area within ring 36 and is engaged in the annular recess 54, with its peripheral edge resting on the upper surface of the ring 38. The screen 90 includes a circular foraminous screen component 92, as of woven wire, and an annular flange 94 joined thereto and received in the recess 54, similar to the flange 64 of screen 60. The lower end portion of a hollow drive tube 96 extends through the center of the screen unit 90. A clamping element 98 is secured to the center portion of the screen and is affixed to the tube 96. The tube 96 extends upward through the hollow drive tube 74, with the upper end of the tube 96 being disposed adjacent the vibrator 28 (FIG. 1). An output drive arm 28a of the vibrator 28 engages a spool element 97 mounted on the upper end of the tube 96 for vibrational drive of the tube, similar to the engagement of vibrators 154 with spools 162 for vibrating the guide 100 as described below. The vibrator 28 drives the tube 96 in a longitudinal reciprocating motion, thereby imparting vertical vibratory motion to the screen section 92. It will be appreciated that the screen is of adequate flexibility to provide the described vibratory motion despite retention of the peripheral flange 94 in the recess 54 for support purposes.

Refering to FIGS. 1–5, a funnel-shaped guide or collector member 100 is resiliently suspended within the casing 40. The member 100 includes a hollow frustoconical upper component 102 and a lower guide component 104. The frustoconical component 102 is formed of sheet metal and is disposed with its larger end 106 upward, beneath the screens 60 and 90. This upper end 106 is of a diameter corresponding generally to the effective exposed diameter of the supply chamber 12 and of the metering screen 60, and is in vertical coincident aligned relation with the screen 60, as illustrated. The lower end 108 of the guide element 102 abuts the upper portion 109 of the lower element 104. The lower element may be formed of aluminum, and the upper portion 109 thereof has a conical inner surface 110 forming a continuation of the inner surface of the element 102. A tubular section 112 leads from the conical section 109 to an outlet end 114 (FIG. 7).

As further seen in FIG. 7, the outlet end 114 is loosely fitted in a connector 115 threadably engaged in an opening 117 in plate 48. Through the connector 115, the outlet 114 communicates with the inlet 116a of a stream divider 116 threadably engaged in connector 115. The inlet 116a communicates with four symmetrically arranged outlet passages 116b. Conduits 118 (FIG. 1) may be connected to the passages 116b for conveying the gas and the entrained powder to four separate processing sites.

Referring again to FIG. 3, a bushing 119 surrounds the lower end portion of the sheet metal element 102 and is appropriately secured thereto, as by soldering. A support plate member 120 is secured to the lower surface of the bushing 119, as by machine screws (not shown), and a flange section 121 of the element 104 is secured to the underside of the plate 120 by similar means. Annular reinforcing ribs 122 and 124 are provided around the outer surface of the member 102, as required, to maintain its desired configuration.

The entire guide unit 100 as thus far described is resiliently supported on four posts 126. As seen in FIG. 4, the four posts are symmetrically disposed around the guide unit 100. Each of these posts is affixed at its lower end to the bottom plate 48. A suspension spring 128 (FIG. 3) is provided at each post 126, with the upper end of the spring secured to a collar 130 mounted on the respective post and the lower end of the spring being attached to the support plate 120. The four springs 128 provide resilient vertical support for the guide unit 100.

Lateral stability for the guide unit 100 is provided by two sets of attachment wires or cables and related attachment means on the posts 126 and on the unit 100. The upper set, seen best in FIGs. 3 and 4 includes a collar 132 secured to the upper end of each post 126. Four attachment members 134 are secured to the sheet metal element 102, in symmetrical disposition about its periphery, and each includes an attachment eyelet 136. By way of example, the attachment members 134 may be cotter pins having their ends splayed and attached to the outer surface of the element 102, as by soldering. Eight stabilizing wires or cables 138 are provided, each having one end secured to one of the collars 132, and its opposite end attached to one of the eyelets 136.

The lower system of stabilizing supports is illustrated more particularly in FIGS. 3, 5 and 7. This system also includes a collar attached to each of the posts 126, as indicated at 140, with four stabilizing wires or cables 142. Each cable 142 is attached at one end to one of the collars 140 and at its opposite end to a collar 144 surrounding the lower portion of the tube 112, as by eyelets 146 (FIG. 7).

With further reference to FIG. 7, as well as to FIGs. 3, 4 and 5, each of the attachment wire or cable units 138 and 142 includes a screw element, as at 148, having threaded engagement with a mating nut element 150 on the respective collar 132 or 140. A swivel 152 is provided in each of the stabilizing units to permit ready rotation of the screw element 148, whereby the length of the various stabilizing wire elements may be readily adjusted for suitable positioning and support of the guide unit 100.

A pair of vibratory drive elements 154 are mounted in the casing 40. The main housings 156 of the elements 154 are secured to the base plate 48, and the movable drive elements 158 engage slots 160 in spools 162 which are affixed to the support plate 120. Accordingly, it will be appreciated that actuation of the vibrators 154, whereby the drive arms 158 reciprocate or oscillate vertically, will impart vibratory motion to the resiliently mounted feeder unit 100. The illustrated vibrators 154 are conventional, commercially available electrically driven components of adjustable vibratory amplitude, though it will be appreciated that other elements such as pneumatic units would serve the same function. The power supply, either electrical or pneumatic, may be extended into the casing through an appropriate sealing bushing, such as illustrated at 164 and 165 in FIG. 3.

With further reference to FIG. 7, a flexible gas-tight seal is provided between the bottom plate 48 and the tube 112 by a rubber diaphragm 166. A peripheral section 168 of the diaphragm is adhered to the upper surface of the plate 48 around the outlet opening 117 through the plate. A center portion 170 of the diaphragm engages the outer surface of the tube 112 in resilient, gas-tight sealing engagement. The diaphragm thus maintains a gas-tight seal around the outlet tube while permitting vibratory motion of the guide unit 100.

Referring again to FIGS. 2, 3 and 6, a flexible frustoconical skirt 172 is in sealing engagement with the feeder housing above the funnel element 102 and extends downward into the funnel element. The skirt 172 may be of any suitable flexible material, such as latex rubber dental dam. The skirt 172 includes an annular flange portion 174 which extends over a spacer flange element 176 and is clamped therewith in recess 56, atop the flange 42. A frustoconical portion 178 of the skirt extends downward from flange 174 into the element 102, along the inner surface 102a of the element 102. The terminal edge 178a of the skirt and the adjacent surface 102a form an annular outlet orifice 179, as will be noted further below.

A gas supply nozzle 180 is mounted in the base plate 48 and includes a laterally directed nozzle 182 whereby gas entering the casing 40 therethrough will have a swirling or cyclonic motion within the casing. The gas supplied through the nzzle 180 is supplied under pressure and comprises the entraining carrier medium for transporting the powder from the apparatus 10 to the site of use, e.g., to a plasma arc torch.

It will be appreciated that the space in casing 40 around the guide unit 100 is sealed, except for an annular nozzle defined by the inner surface of the conical element 102 and the outer surface of the skirt portion 178. Thus the gas fed under pressure through the nozzle 180 swirls upward around the guide unit 100 and enters the funnel-shaped interior over the upper edge of the element 102, see FIG. 6. The gas then passes downward through the annular passage defined between the element 102 and the skirt portion 178 and exits through the orifice 179, thereby being directed downward along the peripheral surface of the funnel-shaped guide. The skirt 178 thus cooperates with the funnel wall for directing and controlling the flow of the gas in the funnel guide. The fact that the skirt element extends upward and outward into sealing relation with the outside casing ensures direction of the gas downward, as described, and precludes leaking of the powder material downward outside of the funnel guide, such as otherwise may be encountered due to instantaneous increases in pressure above the funnel during vigorous vertical vibratory movement.

It will be noted that the skirt section 178 extends a relatively short distance into the guide unit 100, extending downward a distance equal to or slightly less than one-fourth of the total vertical depth of the inner guide surface provided by elements 102 and 104. The skirt is sufficiently short that the sides cannot collapse radially inward into contact with one another (in the manner of a loose flap valve) to preclude passage of material downward through the feeder guide. The flexible skirt element apparently assists in obtaining substantially uniform distribution of the gas around the periphery of the guide element, and thus assists in obtaining substantially uniform rates of gas flow therearound, without requiring the precision and expense necessary to obtain similar uniformity with fixed orifice means. Further, the fluttering motion of a flexible skirt during passage of the entraining gas thereunder apparently assists in precluding the sticking and agglomerating of fine powders on the skirt portion 178.

In the operation of feeder 10 the size of the openings through the screen 60, e.g., screen mesh size, is selected in accordance with the specific material to be fed and the range of feed rates desired. The openings through the screen are much larger than the transverse dimensions of the individual particles of the powder. By way of example, screens of 16 square mesh (16 uniformly spaced stainless steel wires per inch, each wire being 0.023 inch in diameter) have been used to obtain feed rate ranges of 10 to 70 kg/hr. in feeding ultra fine silica materials of the type noted above, e.g., IMSIL A-10 silica of Illinois Minerals Co., Cairo, Ill., having a mean particle size of about 1.8 microns and essentially all below 10 microns. A quantity of the fine particulate material is charged to the reservoir section 12 and rests upon the screen 60, with the feed opening then being suitably sealed to permit pressurization of the feeder. Due to the poor flow characteristics of such extremely fine powders, virtually none of the material will pass through the screen 60 in the absence of rotation of the arms 78, even though the openings in the screen are much larger than the size of the individual particles.

The rate of passage of material of a given particle size distribution through the screen 60 is governed primarily by four factors, i.e., the depth of the material in the reservoir compartment, the size of the openings in the screen, the effective area of the screen, and the rate of rotation of the arms 78. Vibration of the housing and of the screen 60 induced by the vibration of screen 90 also seems to increase the feed rate, where other parameters are constant. Thus, with a specific screen 60, and holding the vibration factor constant, the basic rate of passage of a given material through the feeder is governed and regulated by controlling the rate of rotation of the arms 78, except for such superimposed variations as may be necessary to compensate for any change in the depth of material in the reservoir.

In operation, it appears that variations occur in the rate of feed of the powder through specific local areas of a screen 60. While precise observations are difficult, it is believed that greater or lesser amounts of material are fed through various local areas of the screen. It appears that this is due to variations of the screen from its nominal plane, e.g., the plane of the brush tips. Such variations in the screen may occur as a result of fabrication techniques, particulary in units where close tolerances of flatness are not maintained. Also, variations in the subjacent surface of the support plate may be a factor, particularly with a substantial load of the material supported directly upon the screen.

Another incident of feeding fine materials of the type indicted is that the particles exhibit some tendency to remain agglomerated after passage through the screen 60.

The vibrating screen 90 preferably is of slightly greater mesh, i.e., smaller openings, than the screen 60. The screen 90 serves at least three desirable functions. These include deagglomeration of the powder dropping from screen 60, assistance in distributing the powder uniformly across the receiving end of the funnel despite localized variations of the type noted above, and smoothing or averaging out variations in the instantaneous gross feed rates through screen 60. It has been observed that the vibrating screen tends to retain a minor amount of powder suspended thereover at all times during operation. Apparently this temporary retention attains the latter two noted functions, whereby the powder is fed uniformly throughout the area of the screen, and at a uniform rate. The additional deagglomerating function served by the vibrating screen 90 insures that the individual particles are separated insofar as possible as they are dropped into the guide 100.

As the particles fall from the screen 90, they impinge upon the skirt 178 or the wall of the guide unit 100 and slide therealong until entrained in the gas entering through the orifice 179, or are entrained in the gas without contacting a wall surface. The gas appears to retain some cyclonic motion as it moves through the guide 100. Vigorous vibratory movement of the funnel, coupled with the scouring and entraining action of the gas, and the fluttering of the skirt 178, preclude adherence or accumulation of the particles on the guide surfaces. Thus reagglomeration is minimized or prevented, and uniform dispersion of the particles is obtained in the flow stream through outlet 114 to best expose the individual particles for efficient reaction, or other processing, as in the plasma arc torch, as desired.

By way of a specific example of the feeder guide apparatus 100 which has been operated satisfactorily, a conical element 102 of sheet steel with a highly polished inner surface was utilized in a housing as described above having an inside diameter of about 12.3 inches. The element 102 had a 12 inches maximum upper diameter and a height of 13.2 inches, with a lower component 104 of aluminum and having a smooth mirror polish inner surface 110. This element 104 was 4½ inches overall height, with section 109 being about 2½ inches and the tube 112 being about 2 inches in length and ¼ inch inside diameter. The skirt was formed of latex rubber dental dam of about ½ oz. per square foot (about 0.011 inch thick) and was of a configuration to rest on the inner surface of member 102 when the apparatus was not in operation. Carrier gas was supplied through nozzle 180 at a rate of about 300 standard ft.³ per hr., providing a gas pressure in the feeder 10 on the order of 10 psi. It will be appreciated that this pressure varies with the back-pressure effect of the delivery tubes 118 and related equipment. Electrically driven vibrators 154 were utilized providing a vibration rate of 60 cycles per second, with a vertical vibrational movement of the funnel unit of a total excursion from peak to peak of from about 0.5 mm to about 2 mm. The higher vibrational amplitudes appeared to be more desirable. For instance, with the higher amplitude the funnel remained quite clean of adhered or agglomerated particles even when the rubber skirt 172 was removed.

The apparatus 10 described above operated satisfactorily, in feeding the fine silica, with skirts 178 having a lower edge about 4.7 inches above the bottom of the funnel surface. Longer skirts tended to collapse under the feed gas pressure and thereby to close off passage through the funnel. With skirts ending between about 4.7 inches and about 10 inches above the outlet of the conical element, i.e., extending about 5.7 inches to about 11 inches vertically into the funnel, a film of the fine silica quickly reached a steady state on the lower portion of the skirt. A skirt extending about 4 inches vertically into the funnel (terminating about 11.8 inches above the outlet tube) provided the best operating results, that is, the least silica film remaining thereon. When no skirt element 172 was utilized to close the gap between the top of element 102 and the surrounding housing, the powder fell or was blown down between the casing and the outside of the funnel, and some accumulated in the lower 2 inches of the funnel.

The following table reflects feed rates obtained with various materials and various screens, and with variations in the rate of rotation of the spreader arms. These tests were conducted with a casing 40 of about 12.3 inches inside diameter, and with metering screens 60 and vibrating screens 90 of corresponding size, as described above. The vibrator for screen 90 was operated during all runs, including those in which the screen 90 was omitted. Each screen had an effective screen area of about 0.78 ft.² brating screen 90, particularly when using a relatively fine metering screen 60.

The feeder 10' illustrated in part in FIG. 8 includes the same components as described above with respect to the feeder 10, and such components included in FIG. 8 are identified by the same numerals as in FIGs. 1–7. The feeder 10' includes a gas screen unit 188 interposed between the screen 60 and the guide unit 100. The gas screen unit includes a screen 190 of the same general construction as the aforedescribed screen 90, and has its peripheral edge engaged in the annular recess 56, atop the flange section 174 of the skirt element 172. A rotatable hollow support tube 192 extends downward through the support tube 96, with its lower end extending through the center of screen 190. Appropriate bearing components 194 may be attached to the screen and to the tube 192 for journalling the lower end of the tube 192. Below screen 190, the tube 192 carries a plurality of radially extending manifold arms 196, e.g. two arms 196. Each of these arms is provided with outlet orifices in its upper surface.

The upper end of tube 192 is journalled in the upper portion of the power section 14 (see FIG. 1) and is engaged by a suitable drive train driven by motor 32 for rotating the tube and the arms 196. Also, gas under pressure is supplied to the tube 192 at its upper end, through an appropriate manifold slip-joint connection (not shown).

In operation, the motor 32 rotates the tube 192 and thereby rotates the arms 196 while gas under pressure is fed to the arms through the tube 192. The gas is discharged upward through the screen 190 to assist in maintaining deagglomeration and uniform distribution and flow of the fine powder being fed through the apparatus 10'. It will be appreciated that the gas fed through the gas screen unit becomes a part of the entraining carrier gas, and may be in addition to or in lieu of gas supplied through orifice 179.

As an alternative or additional element, an inverted conical element 198 may be included to reduce the distance of free fall of particles dropping through the feeder, thereby reducing the likelihood of adherence and agglomeration of the powder particles on the various surfaces of the feeder guide components. The element 168 should be vibrated to assure prevention of

TABLE 1

| Powder | Screen, Mesh[1] | | FEED RATE, kg/hr. Rotational Velocity of Spreaders, rpm | | | |
|---|---|---|---|---|---|---|
| | Metering | Vibrating | 1.80 | 6.00 | 10.8 | 12.0 |
| Silica[2] | 16 | 20 | 10 | 35 | 63 | 69 |
| | 20 | 30 | 2.9 | 9.1 | 16 | 18 |
| | 30 | — | 1.5 | 5.0 | 8.6 | 9 .5 |
| Gypsum[3] | 16 | 20 | 20 | 68 | — | — |
| | 20 | 30 | 10 | 32 | 58 | 64 |
| | 30 | — | 3.2 | 10 | 18 | 20 |
| Quicklime with 21.5% carbon[4] | 20 | 30 | 18 | 62 | — | — |
| | 30 | — | 11 | 35 | 64 | 71 |
| Mica[5] | 16 | 20 | 5.5 | 18 | 32 | 35 |

[1]Wires per inch in a uniform square mesh of stainless steel wires each 0.015" in diameter in 30 mesh 0.020" in diameter in 20 mesh, and 0.023" in diameter in 16 mesh.
[2]IMSIL A-10, essentially all below 10 microns, with a mean particle size of 1.8 microns.
[3]Essentially all below 90 microns, with a mean particle size of 16.5 microns.
[4]All below 22 microns, with a mean particle size of 4.7 microns, mixed with 21.5% of carbon of BET surface area of 130 m²/gm.
[5]Essentially all below 32 microns, with a mean particle size of 10.5 microns.

The foregoing data illustrates linear variation of the feed rate with the rate of rotation of the brush arms, and also indicates the possibility of eliminating the visuch adherence and/or agglomeration. To this end, it may be attached to vibrator tube 96, or to another tube or rod replacing tube 192 and which would be vibrated in a manner similar to tube 96, or may be affixed to the vibrating conical element 102 by appropriate struts (not shown).

FIG. 9 illustrates a modified guide unit construction in a feeder 10'' which is similar to the feeders 10 and 10' described above in other respects. Components which are the same as or very similar to those described above are given the same identifying number in FIG. 9.

In the apparatus 10'', a funnel-shaped collector and guide 200 is formed of flexible rubber material such as that described above with respect to the skirt 172. The funnel unit 200 includes an outer flange 202 extending over and adhered to an annular support flange 204. The superposed flanges 202 and 204 extend outwardly beyond recess 56 and are clamped between the under surface of the ring 38 and the upper surface of the flange 42. These flanges 202 and 204 are provided with a large number of air passages 206 disposed around the entire periphery of the feeder casing, with the passages 206 extending from the space beneath the funnel 200 upward into the space defined by the recess 56. An additional annular flange 208, which may be formed of the same dental dam material, is adhered to the upper surface of the flange 202 in an area radially outward from the air passages 206. The flange 208 extends radially inward a short distance beyond the upper edge of the conical surface of the funnel element 200, with the inner portion being free and spaced above the flange 202 and openings 206 to guide the inflowing gas into the funnel 200.

The central-lower end of the funnel element 200 is attached to the upper end of an elongated feed tube 212 which extends downward to the outlet connector 115 in the support plate 48. An upper set of four stabilizing wires or cables 214 are secured to a collar 216 on the upper portion of tube 212 and to collars 218 on the posts 126, in the same manner as the lower support system in the embodiment of FIGS. 1–7. A lower support system is also provided as in the feeder of FIGS. 1–7. A vibrator 220, similar to vibrators 28 and 154, is mounted with its main housing secured to the base plate 48 and its operating arm 222 engaging an annular recess 224 in a hardened steel spool 226 which is secured to the tube 212. Operation of the vibrator 220 thus imparts vibratory motion to the tube 212 and to the flexible funnel unit 200.

The funnel 200 may be formed from a simple flat disc of flexible rubber material, with a hole formed in the center and the immediately surrounding portion of the membrane suitably clamped to the upper end of tube 212, ad by a clamping ferrule 228. The height of the funnel (the vertical distance between flange 202 and the inlet end of tube 212), and consequently the angle of inclination of the side walls of the funnel guide, is determined by the distance which the center portion is pulled downward in attaching the spool 226 to the vibrator arm 222.

It has been found that with adequate amplitude of vibration, a rubber funnel embodiment as illustrated in FIG. 9 operated very well in feeding the fine silica noted above with funnel configurations as shallow as 5 cm and 15 cm vertical depth and a diameter between flanges 202 of about 12 inches. In feeding such material, the vibrator 220 was operating at 60 cycles per second, with an amplitude of vertical movement of the tube 212 of about 4 mm. A very thin film of the silica particles formed on the rubber funnel inner surface, with no further accumulation during continued operation.

FIGs. 11–13 illustrate the guide section 230 of a feeder utilizing a fixed funnel-shaped guide or collector unit in place of the guide unit 100 and related components of a feeder 10. A fixed housing 232 is joined to the underside of annular ring 38, in sealing relation therewith, in the same general manner as housing 40. The housing 232 is provided with a conical inner surface 232a having an upper end of a diameter corresponding to the inside diameter of ring 38, and a lower end leading to an outlet connector 234 to which a stream divider 116 or other conduit means may be attached. Powder is fed to the guide housing 230 from metering and deagglomerating apparatus in the manner described above, and thus falls into the conical guide defined by the inner surface 232a.

In the embodiment of FIGs. 11–13, the entraining gas is supplied through a rotating manifold assembly 236 which carries a pair of scrapers 238 and 240. The manifold assembly is supended on a hollow rotatable tube 242, which may correspond to tube 192.

The manifold assembly 236 includes a horizontal conduit bar 244 mounted on the lower end of the tube 242, with a pair of manifold tubes 246 and 248 mounted in the outer ends of the bar 244 and extending downward therefrom along the surface 232a. The bar 244 is formed from two similar bar sections 250 and 252 (see FIG. 13) having appropriate openings and channels formed therein to define the necessary connections with tubes 242, 246 and 248 and passageways communicating therebetween. A gasket element 254 ensures proper sealing relation between the sections 250 and 252 when secured together, as by machine screws 256, to form the indicated passages.

The hollow tube 242 communicates with a longitudinal internal passage formed by grooves 258 in the sections 250 and 252, and this passage in turn communicates with the recesses 260 and 262 in which the upper ends of the tubes 246 and 248 are clamped. These tubes are closed at their lower ends, and are open at their upper ends for communication with the passages defined by grooves 258. A brace 266 extends between the lower portions of the tubes 246 and 248.

The assembly 236 rotates clockwise, as seen from above; note the directional arrow in FIG. 12. A plurality of outlet orifices 268 are uniformly distributed along the length of each of the tubes 246 and 248. These orifices or ports 268 are provided in the forward outer quadrant of the respective tube, whereby each orifice directs a jet of gas outwardly toward the internal surface 232a adjacent to and forwardly of the respective manifold tube.

Each of the scrapers 238 and 240 is formed of a strip of thin resilient material, such as Kraft paper or acetate. One edge of each strip is secured to the rear side of the respective tube, as at 238a in FIG. 12, with the strip being wrapped around the tube surface and extending forwardly therefrom. The leading edge of each scraper strip presses outward against the inner surface 232a, as at 238b, by the force of the resilient strain of the strip 238. As illustrated in FIG. 12, the orifices 268 preferably are directed outward, e.g., at about 45° to an extended radius of housing 232 passing through the center of the respective tube, so that the gas jets therefrom will impinge on the leading portion of the respective scraper.

As seen in FIG. 13, the scraper 238 includes a lower end portion 270 which is tapered to extend substantially to the lower outlet defined by the surface 232a.

In operation, the gas for entraining the powder being fed through a feeder utilizing the guide section 230 is fed through the manifold assembly 236. Due to the direction of the outlet ports, a turbulent gaseous flow is created within the chamber, which assists in entraining the particles with minimization of adherence to the surface 232a. Further, the scrapers 238 and 240 ensure that any particles that might adhere to the conical guide surface will be loosened promptly. The impingement of the jets from the orifices 268 in the areas of the leading edges of the scrapers assists in breaking up and deagglomerating any materials scraped from the surface by the scrapers. Accordingly, the deagglomerated powder dropped into the housing 230 is entrained in the conveying gas in a well distributed state as this gas passes out through the connector 234 for conveying the powder to processing sites.

Obviously, various other modifications of the embodiment shown may be made without departing from the spirit and scope of the invention. For example, additional vibratory screens may be inserted between the metering screen 60 and the guide 100 to obtain greater uniformity in the feed rate and distribution.

The embodiments utilizing a vibrating guide unit present various advantages by way of simplicity of construction and avoidance of components subject to high wear rates. For instance, no mechanical componets are placed in the path of the particles in the collecting and guiding housing, and the entire manifold and scraper assembly is omitted in favor of the simple vibrator components disposed externally of the powder flow path. Also, the vibration of the guide provides substantially instantaneous release action over the entire guide surface at all times, thereby minimizing the opportunities for build-up and agglomeration in the event of adherence of any of the powder to the guide wall. Because of such advantages of simplicity, economy and efficiency of operation, the vibrating guide unit represents a preferred embodiment.

It will thus be seen that an improved powder feeder has been provided which attains the objects noted above.

While particular embodiments of this invention are illustrated and described herein, it will be understood of course, that the invention is not to be limited thereto since many modifications may be made by those skilled in the art, particularly in light of the foregoing teachings. It is contemplated therefore by the appended claims to cover any such modifications as fall within the true spirit and scope of the invention.

What is claimed is:

1. Apparatus for feeding fine particulate material at an accurately controlled uniform rate comprising a hopper for storing such material and including a foraminous outlet member in its lower end, dispensing means including means for sifting such material from said hopper through said foraminous member and causing material to fall from said dispensing means in a dispersed state and at a predetermined rate, funnel-shaped guide means having its larger end open upward and subtending said dispensing means for receiving therein such dispersed material falling from said dispensing means, said guide means having a downwardly converging smooth continuous inner surface terminating at a small outlet opening in its lower end beneath said upwardly open end, means for directing a flow of gas along said inner surface and causing such gas to flow downward through said guide means for entraining such material as it falls into and through said guide means and for immediately carrying such material out of said guide means through said outlet opening entrained and dispersed in such gas, and further means for preventing adherence or accumulation of such material on said inner surface of said guide means, such gas flow and said further means thereby immediately and continuously moving such material downward through said guide means as soon as received therein and preventing any significant static accumulation or agglomeration of said material in said guide means, to provide controlled uniform feeding movement of such material from said guide means in said gas.

2. Apparatus as in claim 1 wherein said dispensing means includes vibratile screen means interposed between said outlet and said guide means.

3. Apparatus as in claim 2 wherein said dispensing means includes a gas screen unit interposed between said vibratile screen means and said guide means.

4. Apparatus as in claim 1 wherein said means for directing such gas flow includes a gas conduit member movable along the inner surface of said guide means, means for supplying gas to said gas conduit member, and said conduit member having outlet orifices disposed to direct such gas outwardly against the inner surface of said guide means.

5. Apparatus as in claim 4 wherein said further means includes a scraper element mounted on said gas conduit and extending outward into resilient scraping contact with said inner surface.

6. Apparatus as in claim 1 wherein said means for directing such gas flow includes means for directing such gas donward along the inner surface of said guide means in substantially uniform distribution around the perimeter thereof.

7. Apparatus as in claim 6 wherein said directing means comprises a flexible skirt overlying an upper portion of said inner surface, and means for supplying such gas to said guide means between said upper portion and said skirt.

8. Apparatus as in claim 1 wherein said sifting means includes brush means movable over the upper surface of said foraminous member and having bristles extending downward into yielding contact with said member for assisting in movement of such material through said member.

9. Apparatus as in claim 1 wherein said funnel-shaped guide means defines a frusto-conical inner surface from said open end to said outlet opening.

10. Apparatus as in claim 1 wherein said further means comprises means for vibrating said guide means.

11. Apparatus as in claim 10 wherein said guide means is formed of flexible material.

12. Apparatus for feeding fine particulate material at an accurately controlled rate comprising a hopper for storing such material and including a foraminous outlet member in its lower end, dispensing mmeans including means for sifting such material from said hopper through substantially the entire area of said foraminous member in a dispersed state and at a predetermined rate and causing such material to fall from said dispensing means in at least an equivalent state of dispersion across a similar subtending area, a funnel-shaped guid having its larger end open upward and subtending said outlet member for receiving such falling material in such state of dispersion, said guide havng a downwardly converging frusto-conical inner surface terminating at a small outlet opening in its lower end beneath said upwardly open end, means for directing a flow of gas downward along said inner surface and for causing said gas to flow through said guide means and outward through said outlet opening for entraining such material as it falls into and through said guide means and for immediately carrying such material out of said guide means through said outlet opening entrained and dispersed in said gas, means for vibrating said guide for preventing adherence or accumulation of such material on said inner surface of said guide, whereby such material received through said upward end of said guide is immediately and continuously moved downward through said guide as soon as received therein without any significant static accumulation or agglomeration of said material in said guide, to provide controlled uniform feeding movement of said material from said guide in said gas.

13. Apparatus as in claim 12 wherein said dispensing means includes a vibratile screen interposed between said foraminous outlet member and said guide.

14. Apparatus as in claim 12 wherein said directing means comprises a skirt overlying an upper portion of said inner surface, and means for supplying such gas to said guide means between said upper portion and said skirt.

15. Apparatus as in claim 12 wherein said sifting means includes brush means movable over the upper surface of said foraminous member and having bristles extending downward into yielding contact with said member for assisting in movement of such material through said member.

16. Apparatus as in claim 12 including means for supplying such gas to said gas flow directing means under pressure.

17. A method of feeding fine particulate material at an accurately controlled and uniform rate comprising providing a supply of said material, dropping said material from said supply into an entrainment chamber at a predetermined rate and in a state of dispersion by brushing such material through a foraminous member over said chamber, such chamber being defined by walls presenting a smooth uninterrupted surface extending from an upper opening for entry therein of said dispersed material to a small lower exit opening beneath said upper opening, simultaneously and continuously vibrating said walls and flowing a gas downward through said chamber, entraining said material in said flowing gas while said material is being so passed through said chamber in such a dispersed state, thereby immediately and continuously passing said dispersed and falling material through such entrainment chamber in a continuing state of dispersion and without any significant static accumulation or agglomeration of said material in said chamber, and conveying said gas from said chamber through said exit with said material entrained and dispersed therein.

18. A method as in claim 17 including passing such material through a vibrating screen as the material drops from said foraminous member to said chamber.

* * * * *

UNITED STATES PATENT OFFICE
CERTIFICATE OF CORRECTION

Patent No. 3,841,530  Dated October 15, 1974

Inventor(s) DONALD R. JANNINCK

It is certified that error appears in the above-identified patent and that said Letters Patent are hereby corrected as shown below:

Column 2, line 13, "rotaty" should read -- rotary --. Column 3, line 3, "or" should read -- for --. Column 6, line 52, "nzzle" should read -- nozzle --. Column 8, line 9, "particulary" should read -- particularly --. Column 8, line 15, "indicted" should read -- indicated --. Column 9, Table 1, 1st column, "Screen, Mesh$^1$" should appear directly over the columns entitled "Metering" and "Vibrating". Column 9, Table 1, last column under "Silica", 3rd item, "9     .5" should read -- 9.5 --. Column 10, line 45, "168" should read -- 198 --. Column 11, line 52, "ad" should read -- as --. Column 13, line 63 (Claim 1), after "causing" insert -- such --. Column 14, line 40 (Claim 6), "donward" should read -- downward --. Column 14, line 65 (Claim 12), "mmeans" should read -- means --. Column 15, line 4 (Claim 12), "guid" should read -- guide --.

Signed and sealed this 14th day of January 1975.

(SEAL)
Attest:

McCOY M. GIBSON JR.
Attesting Officer

C. MARSHALL DANN
Commissioner of Patents